(12) United States Patent
 Kitsunezuka

(10) Patent No.: US 11,514,277 B2
(45) Date of Patent: Nov. 29, 2022

(54) SENSING SYSTEM, SENSOR NODE DEVICE, SENSOR MEASUREMENT VALUE PROCESSING METHOD, AND PROGRAM

(71) Applicant: NEC Corporation, Tokyo (JP)

(72) Inventor: Masaki Kitsunezuka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 669 days.

(21) Appl. No.: 16/475,431

(22) PCT Filed: Nov. 30, 2017

(86) PCT No.: PCT/JP2017/043055
§ 371 (c)(1),
(2) Date: Jul. 2, 2019

(87) PCT Pub. No.: WO2018/131311
PCT Pub. Date: Jul. 19, 2018

(65) Prior Publication Data
US 2019/0340471 A1    Nov. 7, 2019

(30) Foreign Application Priority Data
Jan. 10, 2017 (JP) .............................. JP2017-002008

(51) Int. Cl.
*G06N 20/00* (2019.01)
*G01S 5/02* (2010.01)
(Continued)

(52) U.S. Cl.
CPC .......... *G06K 9/6288* (2013.01); *G01S 5/0289* (2013.01); *G06N 20/00* (2019.01); *H04W 64/003* (2013.01)

(58) Field of Classification Search
CPC .... G06K 9/6288; G01S 5/0289; G06N 20/00; H04W 64/003
See application file for complete search history.

(56) References Cited

U.S. PATENT DOCUMENTS

2007/0067742 A1   3/2007   Takaoka et al.
2011/0161261 A1   6/2011   Wu et al.
(Continued)

FOREIGN PATENT DOCUMENTS

| JP | H10-320007 A | 12/1998 |
|----|--------------|---------|
| JP | 2007-018490 A | 1/2007 |

(Continued)

OTHER PUBLICATIONS

Japanese Office Action for JP Application No. 2018-561843 dated Dec. 21, 2021 with English Translation.

(Continued)

*Primary Examiner* — Manuel A Rivera Vargas
(74) *Attorney, Agent, or Firm* — Sughrue Mion, PLLC

(57) ABSTRACT

A sensing system including multiple sensor node devices and an analysis device, wherein: each of the multiple sensor node devices has a sensor that measures a measurement target and acquires data values, a learning unit that, based on the data values, learns a model used to estimate the data values at an installation position of the sensor, and a communication unit that transmits learning result data indicating a learning result from the learning unit; and the analysis device has a spatial analysis unit that estimates a spatial distribution of the data values based on the learning result data from each of the multiple sensor node devices and the installation positions of the respective sensor node devices.

13 Claims, 8 Drawing Sheets

(51) Int. Cl.
*G06K 9/62* (2022.01)
*H04W 64/00* (2009.01)

(56) References Cited

U.S. PATENT DOCUMENTS

2015/0341980 A1 11/2015 Gallo et al.
2018/0181111 A1* 6/2018 Cussonneau ........... G05B 17/02

FOREIGN PATENT DOCUMENTS

| JP | 2007-091104 A | 4/2007 |
| JP | 2009-238196 A | 10/2009 |
| JP | 2010-271978 A | 12/2010 |
| JP | 2011-118755 A | 6/2011 |
| JP | 2011-138487 A | 7/2011 |
| JP | 4787578 B2 | 10/2011 |
| JP | 2013-055570 A | 3/2013 |
| JP | 2013-211616 A | 10/2013 |
| JP | 2014-228972 A | 12/2014 |
| JP | 2015-001891 A | 1/2015 |
| JP | 2015-023668 A | 2/2015 |
| JP | 2015-097059 A | 5/2015 |
| JP | 2016-028466 A | 2/2016 |
| JP | 2016-115289 A | 6/2016 |
| WO | 2012/169003 A1 | 12/2012 |
| WO | 2014/109040 A1 | 7/2014 |
| WO | 2016/067483 A1 | 5/2016 |

OTHER PUBLICATIONS

International Search Report for PCT Application No. PCT/JP2017/043055, dated Jan. 16, 2018.
Japanese Office Action for JP Application No. 2018-561843 dated Jun. 29, 2021 with English Translation.
Japanese Office Action for JP Application No. 2018-561843 dated Jun. 28, 2022 with English Translation.

* cited by examiner

SENSING SYSTEM, SENSOR NODE DEVICE, SENSOR MEASUREMENT VALUE PROCESSING METHOD, AND PROGRAM

This application is a National Stage Entry of PCT/JP2017/043055 filed on Nov. 30, 2017, which claims priority from Japanese Patent Application 2017-002008 filed on Jan. 10, 2017, the contents of all of which are incorporated herein by reference, in their entirety.

TECHNICAL FIELD

The present invention relates to a sensing system, a sensor node device, a sensor measurement value processing method, and a program.

BACKGROUND ART

A number of technologies have been proposed for reducing the communication volume in systems for transmitting and receiving sensor measurement data.

For example, Patent Document 1 describes a sensor network system comprising multiple sensor nodes including sensors, and an application device for processing sensor information indicating events detected by the sensors. The sensor nodes compute contribution levels, which indicate the degree of influence that the sensor information has on the resolution of the sensor information distribution overall, and preferentially transmit the sensor information having higher contribution levels.

Thus, in the sensor network system described in Patent Document 1, it is possible to arrange for the sensor information distribution obtained by the application device to be composed of sensor information having high contribution levels (including a large amount of information). This sensor network system is able to reduce the traffic volume between the sensor nodes and the application device. For this reason, in regions requiring high precision and resolution in the sensor information distribution, it is possible to reduce the data that is lost due to congestion or the like.

CITATION LIST

Patent Literature

[Patent Document 1]
  Japanese Patent No. 4787578

SUMMARY OF INVENTION

Problem to be Solved by the Invention

In a system for transmitting information from multiple sensor nodes as in Patent Document 1, it is more preferable for the communication volume to be further reduced.

An object of the present disclosure is to provide a sensing system, a sensor node device, a sensor measurement value processing method, and a program that can solve the above-mentioned problem.

Means for Solving the Problem

According to a first aspect of the present disclosure, a sensing system comprises multiple sensor node devices and an analysis device, wherein: each of the multiple sensor node devices comprises a sensor configured to measure a measurement target and acquires data values, a learning unit configured to, on the basis of the data values, learn a model used to estimate the data values at an installation position of the sensor, and a communication unit configured to transmit learning result data indicating a learning result from the learning unit; and the analysis device comprises a spatial analysis unit configured to estimate a spatial distribution of the data values on the basis of the learning result data from each of the multiple sensor node devices and the installation positions of the respective sensor node devices.

According to a second aspect of the present disclosure, a sensor node device comprises a sensor configured to measure a measurement target and acquires data values; a learning unit configured to, on the basis of the data values, learn a model used to estimate the data values at an installation position of the sensor; and a communication unit configured to transmit learning result data indicating a learning result from the learning unit.

According to a third aspect of the present disclosure, a sensor measurement value processing method comprises: acquiring data values measured by a sensor; learning a model used to estimate the data values at an installation position of the sensor on the basis of the data values; and transmitting learning result data indicating a learning result obtained by the learning.

According to a fourth aspect of the present disclosure, a program is a program that makes a computer execute processes of acquiring data values measured by a sensor; learning a model used to estimate the data values at an installation position of the sensor on the basis of the data values; and transmitting learning result data indicating a learning result obtained by the learning.

Advantageous Effects of Invention

According to the present disclosure, it is possible to further reduce the communication volume, at least in certain cases.

DESCRIPTION OF EMBODIMENTS

Hereinafter, embodiments according to the present disclosure will be explained, but the claimed invention is not limited by the below-described embodiments. Additionally, it is not necessarily essential to have a combination of all of the characteristics explained in the embodiments in order to solve the problem addressed by the invention.

First Embodiment

Figure 1:
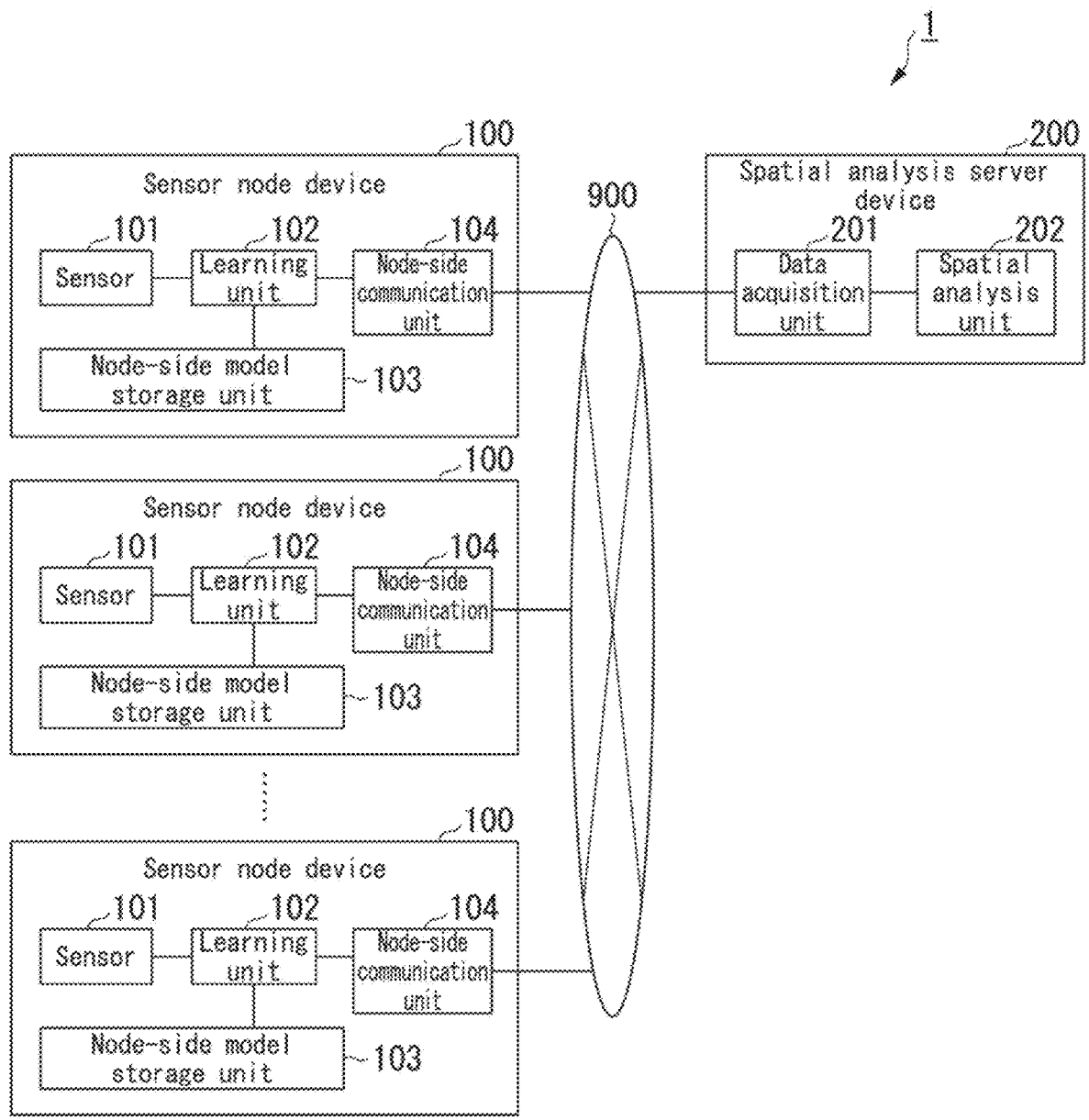
FIG. 1 is a schematic block diagram showing an example of the functional structure of a sensing system according to a first embodiment of the present disclosure.

FIG. 1 is a schematic block diagram showing an example of the functional structure of a sensing system according to a first embodiment of the present disclosure. In the example in FIG. 1, the sensing system 1 comprises multiple sensor node devices 100 and a spatial analysis server device 200. Each of the sensor node devices 100 comprise a sensor 101, a learning unit 102, a node-side mode storage unit 103 and a node-side communication unit 104. The spatial analysis server device 200 comprises a data acquisition unit 201 and a spatial analysis unit 202. The sensor node device 100 and the spatial analysis server device 200 are connected for communication via a communication network 900.

Regarding the number of sensor node devices 100 provided in the sensing system 1, it is sufficient for there to be a plurality thereof.

The communication network 900 relays communications between the sensor node devices 100 and the spatial analysis server device 200. Various types of communication networks may be used as the communication network 900. For example, the communication network 900 may be the internet or a communication network dedicated to the sensing system 1.

The sensing system 1 is a device that analyzes sensor measurement values to estimate the spatial distribution of the sensor measurement values. The sensor measurement values that are estimated by the sensing system 1 may be various values including radio signals, sound waves, audio, vibrations, electric power or traffic. For example, the sensing system 1 may be a radio signal observation system that estimates the spatial distribution of radio signal intensity. Alternatively, the sensing system 1 may be a traffic monitoring system that estimates the spatial distribution of road traffic. Alternatively, the sensing system 1 may be an electric power monitoring system that estimates the spatial distribution of electric power. Alternatively, the sensing system 1 may be a noise monitoring system that estimates the spatial distribution of noise.

The sensor node devices 100 learn a model for estimating the sensor measurement values based on the sensor measurement values at the positions at which the sensors 101 are installed.

The sensors 101 measure the values of measurement target data at the positions at which the sensors 101 themselves are installed. Various types of sensors may be used as the sensors 101. For example, the sensors 101 may be radio signal sensors, sound sensors, vibration sensors or acceleration sensors. Alternatively, the sensors 101 may be electric power sensors or traffic sensors.

The learning units 102 use the measurement values from the sensors 101 to learn models for estimating measurement target data values at the installation positions of the sensors 101.

Additionally, the learning units 102 use the learned models to compute the estimate values of the measurement target data. The measurement target data estimate values computed by the learning units 102 correspond to examples of learning result data indicating learning results from the learning units 102.

The node-side model storage units 103 store the models learned by the learning units 102.

The node-side communication units 104 communicate with other devices. In particular, the node-side communication units 104 transmit learning result data indicating learning results from the learning units 102 to the spatial analysis server device 200 via the communication network 900. Specifically, the node-side communication units 104 transmit the measurement target data estimate values computed by using the models learned by the learning units 102 (also referred to simply as models). Here, the learning result data transmitted by the node-side communication units 104 are not limited to measurement target data estimate values. For example, as mentioned below in connection with the second embodiment, the node-side communication units 104 may transmit data indicating models, such as the parameters of the models. When data indicating models are transmitted, there is no need to compute measurement target data estimate values by using the models in the sensor node devices 100.

Although FIG. 1 illustrates an example in which the node-side communication units 104 are connected to the learning units 102, the node-side communication units 104 are not limited to being connected to the learning units 102. For example, the node-side communication units 104 may be connected to the node-side model storage units 103 and the learning result data may be acquired from the node-side model storage units 103. The same applies to the other embodiments.

Figure 2:
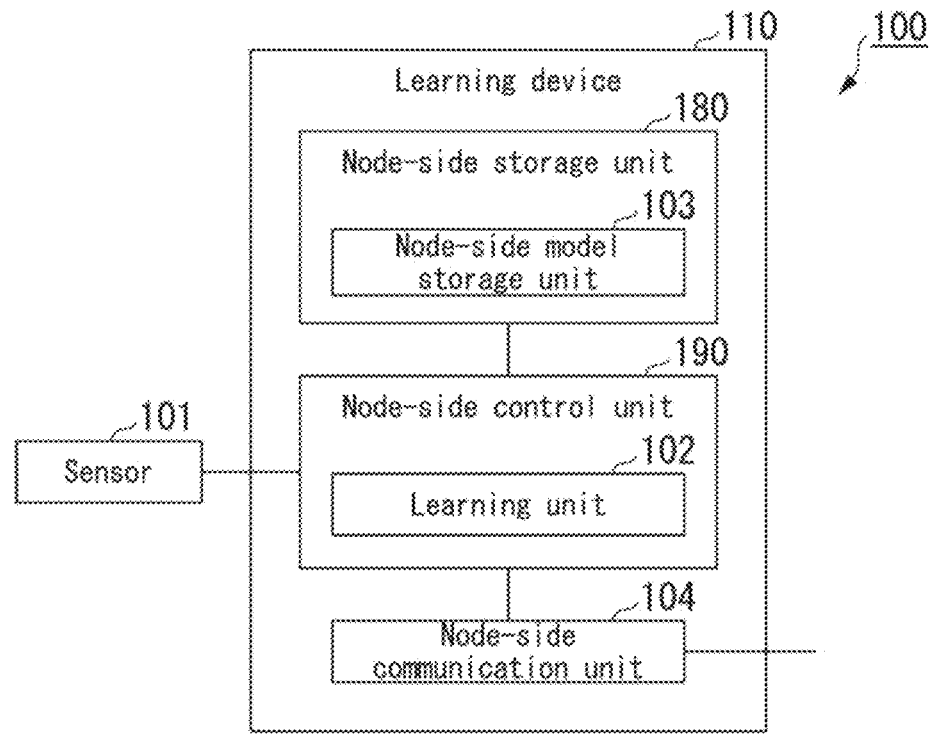
FIG. 2 is a schematic block diagram showing a more detailed example of the functional structure of a sensor node device according to the same embodiment.

FIG. 2 is a schematic block diagram showing a more detailed example of the functional structure of a sensor node device 100. In the example in FIG. 2, the sensor node device 100 comprises a sensor 101 and a learning device 110. The learning device 110 comprises a node-side communication unit 104, a node-side storage unit 180 and a node-side control unit 190. The node-side storage unit 180 comprises a node-side model storage unit 103. The node-side control unit 190 comprises a learning unit 102.

Among the parts in FIG. 2, the parts that are identical to those in FIG. 1 are labeled with the same reference numbers (100, 101, 102, 103, 104), and their explanations will be omitted.

The learning device 110 performs the functions of the learning unit 102, the node-side model storage unit 103 and the node-side communication unit 104. The learning device 110 is configured from a computer or a processor such as, for example, a personal computer (PC), a microcomputer or a workstation. Alternatively, the learning device 110 may be configured from hardware dedicated to the learning device 110.

The node-side storage unit 180 stores various types of data. The node-side storage unit 180 is configured from a storage device or memory provided in the learning device 110.

The node-side control unit 190 controls the parts of the learning device 110 and performs various processes. The node-side control unit 190 is configured from, for example, a CPU (central processing unit), provided in the learning device 110, loading a program from the node-side storage unit 180 and executing the program.

Additionally, the node-side control unit 190 sets the measurement conditions in the sensor 101 (measurement conditions when the sensor 101 takes measurements). For example, the node-side control unit 190 sets, as the measurement conditions, the measurement timing (the times at which measurements are to be made), the measurement resolution (the intervals between measurements) and the number of times measurements are to be repeated. Furthermore, when the measurement target data is data having a frequency, such as radio signals or sound waves, the node-side control unit 190 sets the frequency of the measurement target. However, the measurement conditions set by the node-side control unit 190 are not limited to the above.

Additionally, the measurement conditions of the sensor 101 may be set by a device other than the sensor node device 100. For example, the spatial analysis server device 200 may set the measurement conditions in the sensor 101. In this case, the spatial analysis server 200 transmits the measurement conditions to the sensor node device 100 via the communication network 900. The sensor 101 is thereby instructed to take measurements in accordance with the measurement conditions.

Returning to FIG. 1, the spatial analysis server device 200 acquires measurement target data estimate values from the sensor node devices 100 and estimates a spatial distribution of the measurement target data. The spatial analysis server device 200 corresponds to an example of an analysis device.

The spatial analysis server device 200 is configured from a computer or a processor.

The data acquisition unit 201 acquires learning result data transmitted by the node-side communication unit 104. Specifically, the data acquisition unit 201 acquires measurement target data estimate values computed by the learning unit 102 using a model.

The spatial analysis unit 202 estimates the spatial distribution of measurement target data values on the basis of the learning result data transmitted from each of the multiple sensor node devices 100, and the installation positions of the sensor node devices 100. Specifically, the spatial analysis unit 202 performs spatial interpolation on the measurement target data estimate values obtained from each of the multiple sensor node devices 100. The spatial analysis unit 202 thereby computes measurement target data estimate values for the entire target space.

A known method may be used as the interpolation method used by the spatial analysis unit 202. For example, the spatial analysis unit 202 may perform interpolation by means of any of two-dimensional linear interpolation, kriging and inverse distance weighting, or by a combination thereof.

Figure 3:
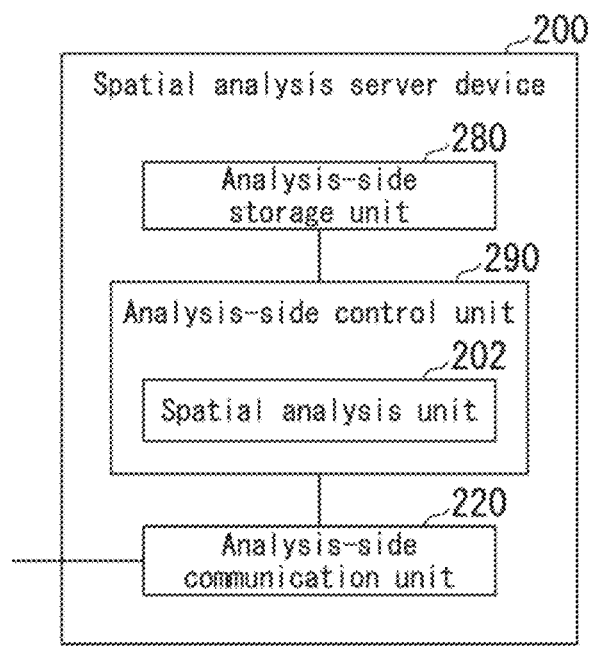
FIG. 3 is a schematic block diagram showing a more detailed example of the functional structure of a spatial analysis server device according to the same embodiment.

FIG. 3 is a schematic block diagram showing a more detailed example of the functional structure of the spatial analysis server device 200. In the example in FIG. 3, the spatial analysis server device 200 comprises an analysis-side communication unit 220, an analysis-side storage unit 280 and an analysis-side control unit 290. The analysis-side control unit 290 comprises a spatial analysis unit 202.

Among the parts in FIG. 3, the parts that are identical to those in FIG. 1 are labeled with the same reference numbers (200, 202), and their explanations will be omitted.

The analysis-side communication unit 220 communicates with other devices. In particular, the analysis-side communication unit 220 receives learning result data transmitted by the node-side communication units 104. The analysis-side communication unit 220 corresponds to an example of the data acquisition unit 201 in FIG. 1.

The analysis-side storage unit 280 stores various data. The analysis-side storage unit 280 is configured from a storage device or memory provided in the spatial analysis server device 200.

The analysis-side control unit 290 controls the parts of the spatial analysis server device 200 and performs various processes. The analysis-side control unit 290 is configured from, for example, a CPU (central processing unit), provided in the spatial analysis server device 200, loading a program from the analysis-side storage unit 280 and executing the program.

Figure 4:
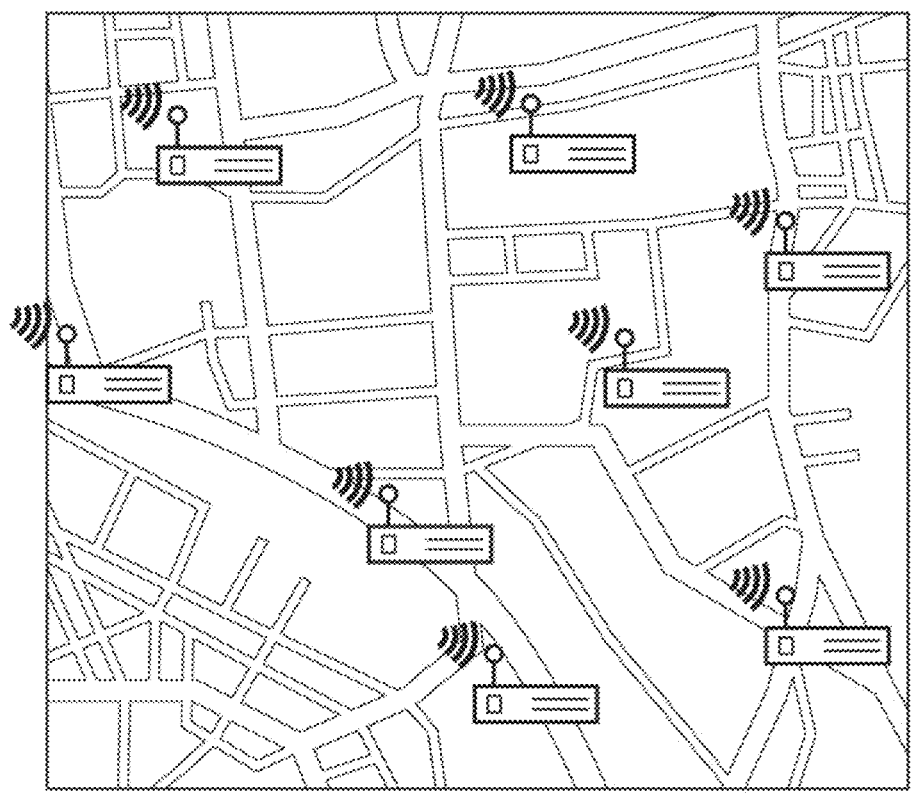
FIG. 4 is a diagram showing an example of the arrangement of sensor node devices according to the same embodiment.

FIG. 4 is a diagram showing an example of the arrangement of sensor node devices 100. FIG. 4 illustrates an example of the case in which each of the sensor node devices 100 learns by measuring the radio signal strength. As illustrated in FIG. 4, the sensor node devices 100 are arranged so as to be scattered in the data measurement target space.

Figure 5:
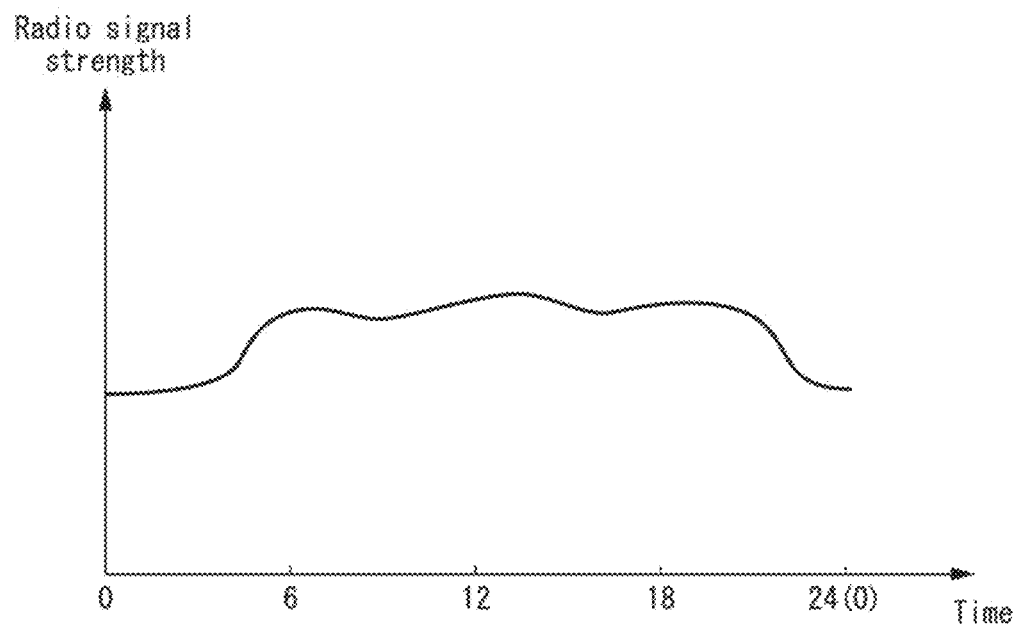
FIG. 5 is a graph showing an example of the input and output of a model learned by a learning unit in a sensor node device according to the same embodiment.

FIG. 5 is a graph showing an example of the input and output of a model learned by a learning unit 102 in a sensor node device 100. The horizontal axis of the graph shown in FIG. 5 denotes the time. The vertical axis denotes the radio signal strength. The radio signal strength may, for example, be the power density of a received radio signal.

The learning unit 102 stores a model that outputs a radio signal strength corresponding to an input time, as in the graph shown in FIG. 5. Various types of models can be applied as the model used by the learning unit 102. For example, the learning unit 102 may use a function such as an n-th order function (n being a positive integer) as the model, and may learn the coefficients of this function. Alternatively, the learning unit 102 may use a support vector machine model or a random forest model.

When the learning unit 102 transmits the information indicating a model as described below in connection with the second embodiment, it is preferable for the model to be indicated by parameters, such as by using an n-th order function as the model.

In FIG. 5, an example of a case in which the learning unit 102 learns a model indicating the relationship between time and measurement target data values is shown.

However, the model learned by the learning unit 102 is not limited to the example shown in FIG. 5. For example, the learning unit 102 may learn a model indicating the relationship between frequency and measurement target data values. Furthermore, for example, the learning unit 102 may learn a model that outputs a measurement target data value corresponding to an input frequency.

Alternatively, the learning unit 102 may learn a model that outputs a measurement target data value corresponding to an input combination of time and frequency. Thus, the learning unit 102 may learn a model that outputs a measurement target value after receiving multiple input values.

Figure 6:
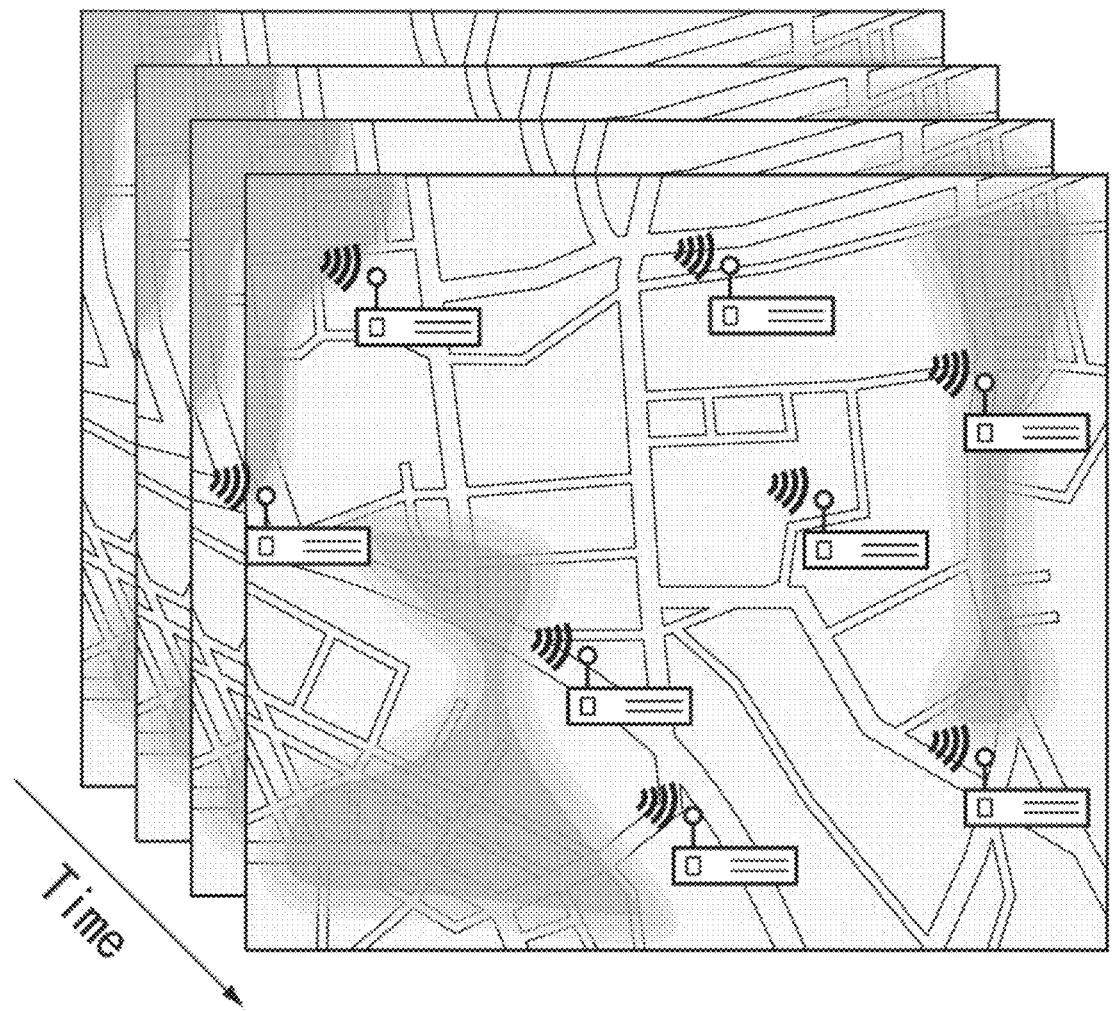
FIG. 6 is a diagram showing an example of a display of measurement target data estimate values computed by the spatial analysis unit according to the same embodiment.

FIG. 6 is a diagram showing an example of a display of measurement target data estimate values computed by a spatial analysis unit 202. In the example in FIG. 6, an example of a case in which the spatial analysis unit 202 estimates a radio signal strength distribution in the target space is shown. In FIG. 6, a distribution of radio signal strengths estimated by the spatial analysis unit 202 is displayed in the manner of a heat map. Furthermore, in the example in FIG. 6, time-series data for estimated values of the radio signal strength distribution are shown in a hierarchical form.

For example, it is possible for the spatial analysis server device 200 to comprise a display device and to display estimated results for the distribution of target data values as in the example in FIG. 6.

If the learning by the learning unit 102 is not in an advanced state, such as when a sensor node device 100 has been newly installed, the measurement target data estimate values from the learning unit 102 may have low accuracy. The spatial analysis server device 200 may acquire sensor measurement values instead of measurement target data estimate values from sensor node devices 100 in which the learning is not advanced.

For example, the analysis-side storage unit 280 in the spatial analysis server device 200 comprises a database (DB) for storing outlying values. The analysis-side storage unit 280 stores, in the database, identification information for sensor node devices 100 in which the learning is not advanced, and sensor measurement values received from these sensor node devices 100. For sensor node devices 100 for which identification information is registered in the database, the spatial analysis unit 202 reads the sensor measurement values from the database instead of receiving the measurement target data estimate values from the sensor node devices 100. In this case, the spatial analysis unit 202 uses the sensor measurement values read from the database for the spatial analysis.

When the difference between sensor measurement values and learning results (estimate values) becomes smaller than a prescribed threshold value in a certain sensor node device 100, the analysis-side control unit 290, for example, deletes the identification information for that sensor node device 100 from the database. In other words, when the difference between sensor measurement values and estimate values becomes smaller than a prescribed threshold value, the learning in the sensor node device can be deemed to be advanced. Because the sensor node device 100 is no longer in a state in which the learning is not advanced, the analysis-side control unit 290 deletes the identification information for that sensor node device 100 from the database.

Figure 7:
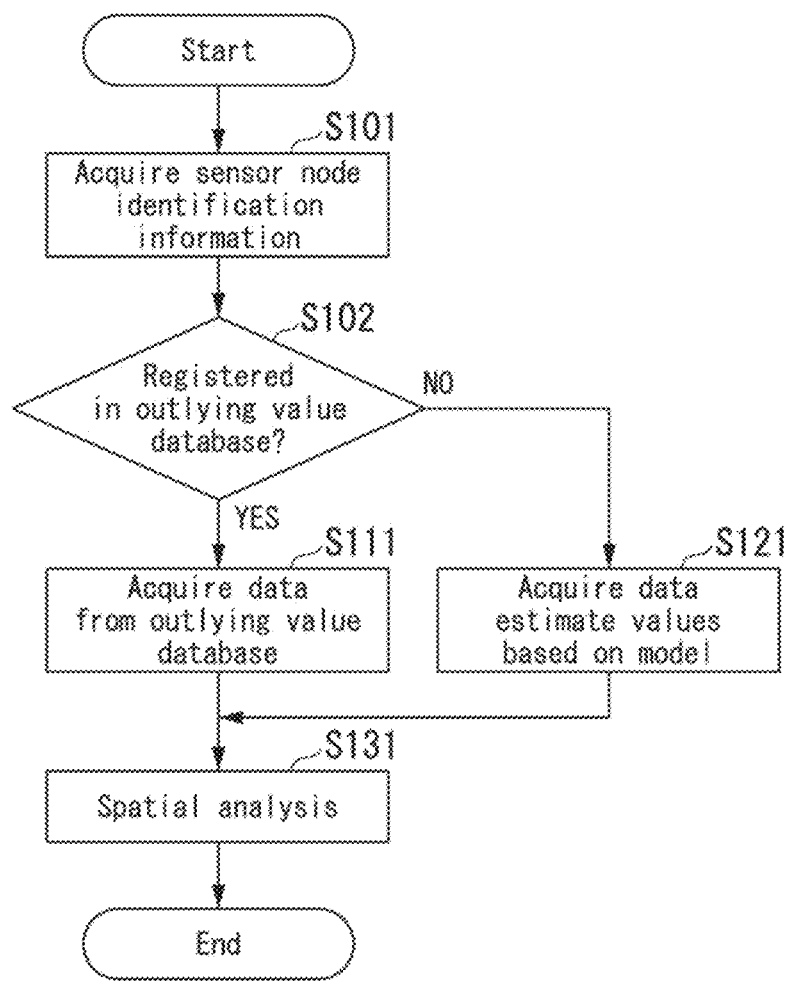
FIG. 7 is a flow chart showing an example of the processing steps by which the spatial analysis server device in the same embodiment acquires data from a sensor node device.

FIG. 7 is a flow chart showing an example of the processing steps by which the spatial analysis server device 200 acquires data from a sensor node device 100.

In the process in FIG. 7, the spatial analysis unit 202 acquires identification information for a sensor node device 100 from which data is being requested (step S101).

Then, the spatial analysis unit 202 determines whether or not the identification information of the sensor node device 100 from which data is being requested is registered in the database (outlying value database) (step S102). In other words, the spatial analysis unit 202 determines whether or not the sensor node device 100 from which data is being requested is registered as a sensor node device 100 in which learning is not advanced.

If it is determined that the identification information of the sensor node device 100 from which data is being requested is registered in the database (step S102, YES), then the spatial analysis unit 202 reads sensor measurement values from the database (outlying value database) (step S111).

Then, the spatial analysis unit 202 estimates the distribution of measurement target data in the target space (performs a spatial analysis process) based on the obtained data (sensor measurement values). In other words, the spatial analysis unit 202 computes estimate values for measurement target data in the target space based on the sensor measurement values read from the database (step S131). The spatial analysis unit 202 performs spatial interpolation on the sensor measurement values to estimate a distribution of measurement target data in the target space.

After step S131, the spatial analysis server device 200 ends the process in FIG. 7.

On the other hand, if it is determined, in step S102, that the identification information of the sensor node device 100 from which data is being requested is not registered in the database (step S102, NO), then the spatial analysis unit 202 acquires estimate values computed by the learning unit 102 using a model (step S121).

After step S121, the spatial analysis server device 200 advances to step S131.

In this case, in step S131, the spatial analysis unit 202 estimates the distribution of measurement target data in the target space (performs a spatial analysis process) using the estimate values obtained in step S121. In other words, the spatial analysis unit 202 computes the measurement target data estimate values in the target space based on estimate values computed by using a model. The spatial analysis unit 202 performs spatial interpolation on the computed estimate values and estimates a distribution of measurement target data in the target space.

Therefore, the spatial analysis unit 202 in step S131 uses one or both of the sensor measurement values obtained in step S111 and the sensor measurement value estimate values obtained in step S121 to compute measurement target data estimate values in the target space.

For example, if it is foreseen that the measurement target will exhibit behavior that is different from normal at a specific time due to an event such as the holding of a social event, the spatial analysis unit 202 may be arranged to perform spatial analysis using sensor measurement values obtained in step S111. In other words, the spatial analysis unit 202 performs spatial analysis based on the sensor measurement values read from the database.

Additionally, when the distribution of measurement target data at a future date and time is to be predicted, the measurement values have not been obtained. Therefore, the spatial analysis unit 202 may be arranged to perform spatial analysis using sensor measurement value estimate values obtained in step S121. In other words, the spatial analysis unit 202 performs spatial analysis based on estimate values computed by using a model. Alternatively, the spatial analysis unit 202 may be arranged to also make use of the newest measurement values obtained in step S111, or arranged to make use of sensor measurement values obtained under conditions similar to those of the future date and time for which the prediction is to be made, such as, for example, at the same time on the same day of the week.

As described above, the learning units 102 use measurement values from the sensors 101 to learn models for estimating measurement target data values at the installation positions of the sensors 101. The node-side communication units 104 transmit learning result data indicating the learning results from the learning units 102 to the spatial analysis server device 200 via the communication network 900 or the like. The spatial analysis unit 202 estimates the spatial distribution of measurement target data values based on the learning result data transmitted from each of the multiple sensor node devices 100, and the installation positions of the sensor node devices 100.

In this way, the learning units 102 learn models for estimating measurement target data values. The sensing system 1 can thereby use these models to determine measurement target data values. Therefore, there is no need for the sensor node devices 100 to store the measurement values (raw data) from the sensors 101. Additionally, there is no need for the sensor node devices 100 to transmit the measurement values (raw data) from the sensors 101 to another device and to have the other device store these measurement values.

Thus, according to the sensing system 1, the storage capacity of the sensor node devices 100 and the communication volume of the sensor node devices 100 both may be relatively small.

In particular, in the steady state, in which the measurement values of the sensors 101 approximately match the estimate values due to the models, there is no need for the sensor node devices 100 to transmit data and there is no need to store data. In other words, due to this feature, the communication volume of the sensor node devices 100 can be further reduced, at least in the steady state.

Additionally, the learning units 102 learn models indicating the relationship between the time and measurement target data values.

Thus, the sensing system 1 can, for example, estimate measurement target data values corresponding to the time, such as, for example, the radio signal intensity at certain hours of the day.

Additionally, the learning unit 102 learns models indicating the relationship between the frequency and the measurement target data values.

Thus, the sensing system 1 can estimate measurement target data values corresponding to frequencies such as, for example, the radio signal strengths in certain frequency bands.

When a measurement value from a sensor 101 differs from an estimate value from a model by a prescribed threshold value or more, the learning unit 102 may exclude this measurement value, as an outlying value, from the learning targets. Thus, when the measurement value from the sensor 101 is an outlying value, that measurement value can be prevented from being reflected in the model.

However, such measurement values that differ greatly from the values estimated by a model can be considered to be important for the analysis by the spatial analysis unit 202. Therefore, when a measurement value from a sensor 101 differs from an estimate value from a model by a prescribed threshold value or more, the node-side communication unit 104 may transmit the measurement value (raw data) to the spatial analysis server device 200. When a measurement value (raw data) is transmitted, the spatial analysis server device 200 may estimate the spatial distribution based not on the estimate value computed by using the model, but rather on the transmitted measurement value. Thus, when a measurement value that differs by a prescribed threshold value or more from an estimate value from a model is important, that measurement value can be applied to spatial analysis in a timely manner.

Second Embodiment

Figure 8:
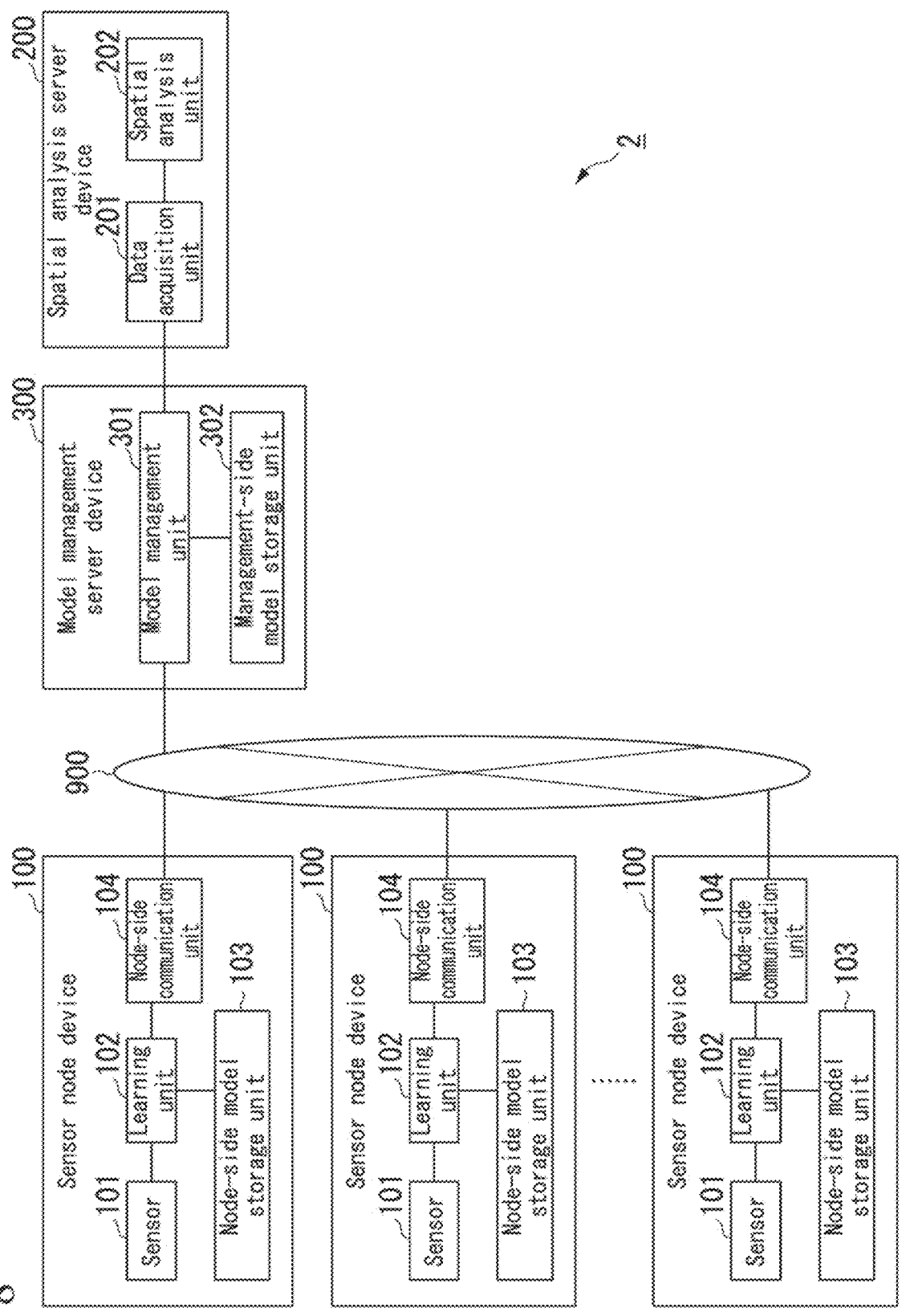
FIG. 8 is a schematic block diagram showing an example of the functional structure of a sensing system according to a second embodiment of the present disclosure.

FIG. 8 is a schematic block diagram showing an example of the functional structure of a sensing system according to a second embodiment of the present disclosure. In the example in FIG. 8, the sensing system 2 comprises sensor node devices 100, a spatial analysis server device 200 and a model management server device 300. The sensor node devices 100 comprise a sensor 101, a learning unit 102, a node-side model storage unit 103 and a node-side communication unit 104. The spatial analysis server device 200 comprises a data acquisition unit 201 and a spatial analysis unit 202. The model management server device 300 comprises a model management unit 301 and a management-side model storage unit 302. The sensor node device 100 and the model management server device 300 are connected for communication via a communication network 900.

Regarding the number of sensor node devices 100 provided in the sensing system 2, it is sufficient for there to be a plurality thereof.

Among the parts in FIG. 8, the parts that correspond to and have the same functions as those in FIG. 1 are labeled with the same reference numbers (100, 101, 102, 103, 104, 200, 201, 202, 900), and their explanations will be omitted. In FIG. 8, the sensing system 2 differs from the sensing system 1 in FIG. 1 in that a model management server device 300 is provided.

The model management server device 300 manages models learned by each of the sensor node devices 100. In particular, the model management server device 300 stores models that are identical to the models stored in each of the sensor node devices 100. Additionally, when a sensor node device 100 is newly installed, the model management server device 300 provides this sensor node device 100 with initial values for a model.

For example, the sensor node device 100 may transmit measurement values (raw data) from the sensor 101, and the model management unit 301 may use these measurement values to learn for a certain period of time and transmit the model that is obtained to the sensor node device 100. Alternatively, the model management unit 301 may prepare a model that is to be provided to newly installed sensor node devices 100 on the basis of a model in another sensor node device 100. For example, the model management unit 301 may provide a newly installed sensor node device 100 with one of the models in another sensor node device 100.

The management-side model storage unit 302 stores models for estimating measurement target data values. In particular, the management-side model storage unit 302 stores models that are identical to the models stored in each of the sensor node devices 100. Thus, when the spatial analysis server device 200 requests measurement target data values, the model management server device 300 can use models to compute estimate values and respond to the spatial analysis server device 200. The communication volume to the sensor node devices 100 can be reduced because there is no need to query the sensor node devices 100 for the values.

The model management unit 301 manages models learned by each of the sensor node devices 100. In particular, the model management unit 301 acquires models from each of the sensor node devices 100 and stores the acquired models in the management-side model storage unit 302. For example, the model management unit 301 acquires model parameters from each of the sensor node devices 100 and updates the model parameter values stored in the management-side model storage unit 302. Thus, the models stored in the management-side model storage unit 302 are updated to models that are the same as the models stored in the respective sensor node devices 100. In this case, the model parameters acquired by the model management unit 301 from each of the sensor node devices 100 correspond to examples of learning result data.

Figure 9:
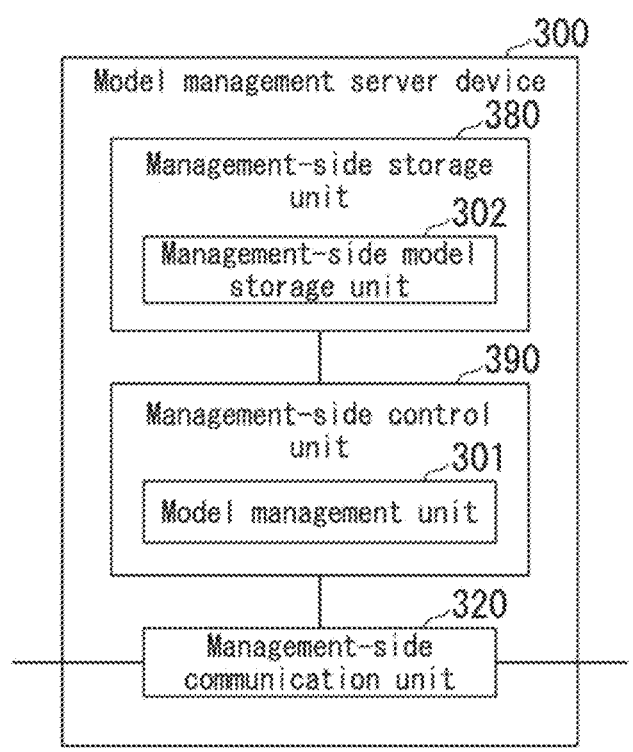
FIG. 9 is a schematic block diagram showing a more detailed example of the functional structure of a model management server device according to the same embodiment.

FIG. 9 is a schematic block diagram showing a more detailed example of the functional structure of the model management server device 300. In the example in FIG. 9, the model management server device 300 comprises a management-side communication unit 320, a management-side storage unit 380 and a management-side control unit 390. The management-side storage unit 380 comprises a management-side model storage unit 302. The management-side control unit 390 comprises a model management unit 301. Among the parts in FIG. 9, the parts that are identical to those in FIG. 8 are labeled with the same reference numbers (300, 301, 302), and their explanations will be omitted.

The management-side communication unit 320 communicates with other devices. In particular, the management-side communication unit 320 communicates with each of the sensor node devices 100 and receives data indicating models, such as model parameters.

The management-side memory unit 380 stores various types of data. The management-side memory unit 380 is configured from a storage device or memory provided in the model management server device 300.

The management-side control unit 390 controls the parts of the model management server device 300 and performs various processes. The management-side control unit 390 is configured from, for example, a CPU, provided in the model management server device 300, loading a program from the management-side storage unit 380 and executing the program.

The timing at which the model management server device 300 receives data indicating models from the sensor node devices 100 may be set to various timings. For example, the model management server device 300 may periodically receive data indicating models from the sensor node devices 100. Alternatively, the model management server device 300 may request data indicating models from the sensor node devices 100 when there is a request for measurement target data values from the spatial analysis server device 200 and the models stored in the management-side model storage unit 302 have not been updated for a certain period of time or longer.

As explained above, the management-side model memory unit 302 stores models that are identical to the models stored in each of the sensor node devices 100 in accordance with control by the model management unit 301.

Thus, when the spatial analysis server device 200 requests measurement target data values, the model management server device 300 can compute measurement target data estimate values and respond. The communication volume to the sensor node devices 100 can be reduced because there is no need to query the sensor node devices 100 for the values.

Next, the minimum structure of the present disclosure will be explained with reference to FIG. 10 and FIG. 11.

Figure 10:
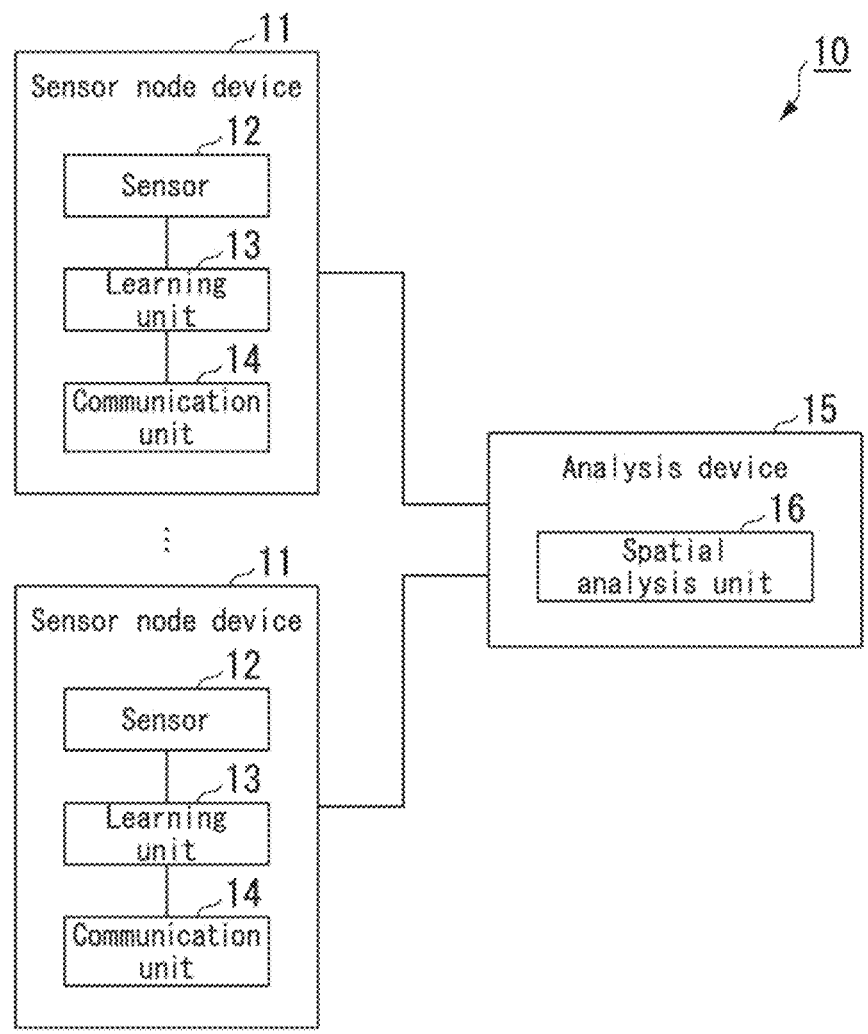
FIG. 10 is a diagram showing the minimum structure of the sensing system according to the present disclosure.

FIG. 10 is a diagram showing the minimum structure of the sensing system according to the present disclosure. The sensing system 10 illustrated in FIG. 10 comprises multiple sensor node devices 11 and an analysis device 15. Each sensor node device 11 comprises a sensor 12, a learning unit 13 and a communication unit 14. The analysis device 15 comprises a spatial analysis unit 16.

In this structure, the learning units 13 learn models to be used to estimate measurement target data values (data values) at the installation positions of the sensors 12, based on measurement values (data values) from the sensors 12. The communication units 14 transmit, to the analysis device 15, learning result data indicating the learning results from the learning units 13. The spatial analysis unit 16 in the analysis device 15 estimates the spatial distribution of measurement target data values (data values) based on the learning result data from each of the multiple sensor node devices 11 and the installation positions of the respective sensor node devices 11.

As a result of the learning units 13 learning models for estimating measurement target data in this way, the sensing system 10 can determine measurement target data values using these models. Since the measurement target data values can be acquired by using models, there is no need for the sensor node devices 11 to store the measurement values (raw data) from the sensors 12. Additionally, there is no need for the sensor node devices 11 to transmit the measurement values (raw data) from the sensors 12 to another device and to have the other device store these measurement values.

Thus, according to the sensing system 10, the storage capacity of the sensor node devices 11 and the communication volume of the sensor node devices 11 both may be relatively small.

In particular, in the steady state, in which the measurement values of the sensor node devices 11 match the estimate values due to the models, there is no need for the sensor node devices 11 to transmit data separately and there is no need to store data separately. Due to this feature, the communication volume of the sensor node devices 11 can be further reduced, at least in the steady state.

Figure 11:
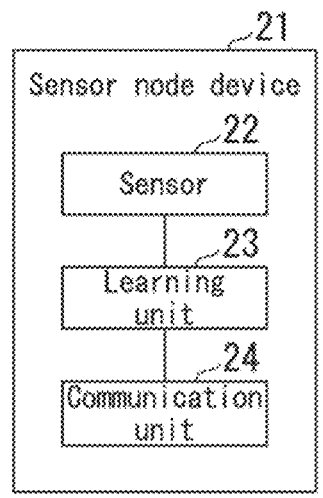
FIG. 11 is a diagram showing the minimum structure of a sensor node device according to the present disclosure.

FIG. 11 is a diagram showing the minimum structure of a sensor node device according to the present disclosure. The sensor node device 21 illustrated in FIG. 11 comprises a sensor 22, a learning unit 23 and a communication unit 24.

With this configuration, the learning unit 23 uses measurement values from the sensor 22 to learn a model to be used to estimate measurement target data values at the installation position of the sensor 22. The communication unit 24 transmits learning result data indicating the learning result from the learning unit 23.

As a result of the learning unit 23 learning a model for estimating measurement target data values in this way, the sensor node device 21 or another device can determine measurement target data values using these models. Therefore, there is no need for the sensor node device 21 to store the measurement values (raw data) from the sensor 22. Additionally, there is no need for the sensor node device 21 to transmit the measurement values (raw data) from the sensor 22 to another device and to have the other device store these measurement values.

Thus, according to the sensor node device 21, the storage capacity of the sensor node device 21 and the communication volume of the sensor node device 21 both may be relatively small.

In particular, in the steady state, in which the measurement values of the sensor node device 21 match the estimate values due to the model, there is no need for the sensor node device 21 to transmit data and there is no need to store data. In other words, due to this feature, the communication volume of the sensor node device 21 can be further reduced, at least in the steady state.

A program for performing all or some of the functions of the node-side control unit 190, the analysis-side control unit 290 and the management-side control unit 390 may be recorded in a computer-readable recording medium, and the program recorded on this recording medium may be loaded in a computer system and executed to perform the processing for the respective parts. The "computer system" mentioned here includes an OS and hardware such as peripheral devices.

Additionally, a "computer-readable recording medium" refers to portable media such as flexible disks, magneto-optic disks, ROMs and CD-ROMS, and to storage devices that are internally installed in computer systems, such as hard disks or the like. Additionally, the above-mentioned program may be for realizing some of the aforementioned functions, and the aforementioned functions may be further realized by combining them with programs already recorded in the computer system.

While embodiments according to the present disclosure have been explained in detail by referring to drawings above, the specific structure is not limited to these embodiments, and designs and the like within the range not departing from the spirit of the present invention are also included. Additionally, these embodiments may be combined as appropriate.

Some or all of the above-mentioned embodiments could be described as in the following supplementary notes, but they are not limited to the following supplementary notes:

(Supplementary Note 1)

A sensing system comprising multiple sensor node devices and an analysis device, wherein:

each of the multiple sensor node devices comprises a sensor configured to measure a measurement target and acquires data values, a learning unit configured to, on the basis of the data values, learn a model used to estimate the data values at an installation position of the sensor, and a communication unit configured to transmit learning result data indicating a learning result from the learning unit; and the analysis device comprises a spatial analysis unit configured to estimate a spatial distribution of the data values on the basis of the learning result data from each of the multiple sensor node devices and installation positions of the respective sensor node devices.

(Supplementary Note 2)

The sensing system according to appendix 1, wherein the model learned by the learning unit indicates a relationship between time and the data values.

(Supplementary Note 3)

The sensing system according to appendix 1, wherein the model learned by the learning unit indicates a relationship between frequency and the data values.

(Supplementary Note 4)

The sensing system according to any one of appendices 1 to 3, comprising:

a model management server device configured to store the models of the respective sensor node devices included in the learning result data transmitted from each of the multiple sensor node devices, and use the models to compute estimate values of the data values; wherein the spatial analysis unit is configured to estimate the spatial distribution of the data values on the basis of the computed estimate values of the data values.

(Supplementary Note 5)

The sensing system according to any one of appendices 1 to 4, wherein the learning result data are the estimate values of the data values or parameter values of the model.

(Supplementary Note 6)

The sensing system according to any one of appendices 1 to 5, wherein sensors are one of radio signal sensors, sound sensors, vibration sensors, acceleration sensors, power sensors and traffic sensors.

(Supplementary Note 7)

A sensor node device comprising:

a sensor that configured to measure a measurement target and acquires data values;

a learning unit configured to, on the basis of the data values, learn a model used to estimate the data values at an installation position of the sensor; and a communication unit configured to transmit learning result data indicating a learning result from the learning unit.

(Supplementary Note 8)

The sensor node device according to appendix 7, wherein the learning result data are the estimate values of the data values or parameter values of the model.

(Supplementary Note 9)

The sensor node device according to appendix 7 or 8, wherein the sensor is one of a radio signal sensor, a sound sensor, a vibration sensor, an acceleration sensor, a power sensor and a traffic sensor.

(Supplementary Note 10)

A sensor measurement value processing method comprising:

acquiring data values measured by a sensor;

learning a model used to estimate the data values at an installation position of the sensor on the basis of the data values; and transmitting learning result data indicating a learning result obtained by the learning.

(Supplementary Note 11)

The sensor measurement value processing method according to appendix 10, wherein the learning result data are the estimate values of the data values or parameter values of the model.

(Supplementary Note 12)

The sensor measurement value processing method according to appendix 10 or 11, wherein the sensor is one of a radio signal sensor, a sound sensor, a vibration sensor, an acceleration sensor, a power sensor and a traffic sensor.

(Supplementary Note 13)

A program that makes a computer execute processes of:

acquiring data values measured by a sensor;

learning a model used to estimate the data values at an installation position of the sensor on the basis of the data values; and transmitting learning result data indicating a learning result obtained by the learning.

Priority is claimed on Japanese Patent Application No. 2017-002008, filed Jan. 10, 2017, the content of which is incorporated herein by reference.

INDUSTRIAL APPLICABILITY

According to the present disclosure, it is possible to further reduce the communication volume, at least in certain cases.

REFERENCE SIGNS LIST 1, 2, 10 Sensing system
11, 21, 100 Sensor node device
12, 22, 101 Sensor
13, 23, 102 Learning unit
14, 24 Communication unit
15 Analysis device
16 Spatial analysis unit
103 Node-side model storage unit
104 Node-side communication unit
110 Learning device
180 Node-side storage unit
190 Node-side control unit
200 Spatial analysis server device
201 Data acquisition unit
202 Spatial analysis unit
220 Analysis-side communication unit
280 Analysis-side storage unit
290 Analysis-side control unit
900 Communication network
300 Model management server device 301 Model management unit
302 Management-side model storage unit
320 Management-side communication unit
380 Management-side storage unit
390 Management-side control unit

What is claimed is:

1. A sensing system comprising:
   multiple sensor node devices; and
   an analysis device,
   wherein each of the multiple sensor node devices comprises:
      a sensor configured to measure a measurement target and to acquire data values;
      a learning unit configured to, using the data values, learn a model used to estimate the data values at an installation position of the sensor; and
      a communication unit configured to transmit the acquired data values;
   wherein the communication unit is configured to transmit learning result data indicating a learning result from the learning unit instead of the acquired data values, if a difference between the acquired data values and the data values estimated using the model becomes smaller than a threshold value, and
   wherein the analysis device comprises:
      a spatial analysis unit configured to estimate a spatial distribution of the data values using the learning result data or the data values from each of the multiple sensor node devices, and the installation positions of the respective sensor node devices.

2. The sensing system according to claim 1, wherein the model learned by the learning unit indicates a relationship between time and the data values.

3. The sensing system according to claim 1, wherein the model learned by the learning unit indicates a relationship between frequency and the data values.

4. The sensing system according to claim 1, comprising:
   a model management server device configured to store models of the respective sensor node devices included in the learning result data transmitted from each of the multiple sensor node devices, and to use the models to compute estimate values of the data values;
   wherein the spatial analysis unit is configured to estimate the spatial distribution of the data values using the computed estimate values of the data values.

5. The sensing system according to claim 1, wherein the learning result data are the estimate values of the data values or parameter values of the model.

6. The sensing system according to claim 1, wherein the sensor is one of a radio signal sensor, a sound sensor, a vibration sensor, an acceleration sensor, a power sensor and a traffic sensor.

7. The sensing system according to claim 1, wherein the communication unit is configured to transmit the acquired data values instead of the learning result data, if there is a acquired data value for which a difference from a data value estimated using the model is greater than a threshold value.

8. A sensor node device comprising:
   a sensor configured to measure a measurement target and acquire data values;
   a learning unit configured to, using the data values, learn a model used to estimate the data values at an installation position of the sensor; and
   a communication unit configured to transmit the acquired data values,
   wherein the communication unit is configured to transmit learning result data indicating a learning result from the learning unit instead of the acquired data values, if a difference between the acquired data values and the data values estimated using the model becomes smaller than a threshold value.

9. The sensor node device according to claim 8, wherein the learning result data are the estimate values of the data values or parameter values of the model.

10. The sensor node device according to claim 8, wherein the sensor is one of a radio signal sensor, a sound sensor, a vibration sensor, an acceleration sensor, a power sensor and a traffic sensor.

11. A sensor measurement value processing method comprising:
    acquiring data values measured by a sensor;
    learning a model used to estimate the data values at an installation position of the sensor using the data values; and
    transmitting the acquired data values,
    wherein in the transmitting, learning result data indicating a learning result from the learning unit instead of the acquired data values is transmitted, if a difference between the acquired data values and the data values estimated using the model becomes smaller than a threshold value.

12. The sensor measurement value processing method according to claim 11, wherein the learning result data are the estimate values of the data values or parameter values of the model.

13. The sensor measurement value processing method according to claim 11, wherein the sensor is one of a radio signal sensor, a sound sensor, a vibration sensor, an acceleration sensor, a power sensor and a traffic sensor.

* * * * *